(12) United States Patent
Sakai

(10) Patent No.: US 7,036,304 B2
(45) Date of Patent: May 2, 2006

(54) EXHAUST GAS PURIFYING APPARATUS AND METHOD FOR INTERNAL COMBUSTION ENGINE

(75) Inventor: Akikazu Sakai, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 318 days.

(21) Appl. No.: 10/439,291

(22) Filed: May 16, 2003

(65) Prior Publication Data

US 2004/0003587 A1    Jan. 8, 2004

(30) Foreign Application Priority Data

May 16, 2002    (JP)    ............................. 2002-140952

(51) Int. Cl.
*F01N 3/00*    (2006.01)

(52) U.S. Cl. ............................. 60/285; 60/274; 60/295; 60/297

(58) Field of Classification Search ................. 60/274, 60/277, 285, 295, 297, 301
See application file for complete search history.

(56) References Cited

U.S. PATENT DOCUMENTS

| | | | |
|---|---|---|---|
| 5,894,725 A | * | 4/1999 | Cullen et al. ................. 60/274 |
| 5,974,788 A | * | 11/1999 | Hepburn et al. ............... 60/274 |
| 6,161,378 A | * | 12/2000 | Hanaoka et al. ............... 60/286 |
| 6,233,925 B1 | * | 5/2001 | Hirota et al. .................. 60/285 |
| 6,383,267 B1 | * | 5/2002 | Takaku et al. ................. 96/111 |
| 6,502,389 B1 | * | 1/2003 | Katayama et al. ............. 60/285 |
| 6,519,933 B1 | * | 2/2003 | Ogiso et al. ................... 60/285 |
| 2002/0015669 A1 | | 2/2002 | Hashimoto |

FOREIGN PATENT DOCUMENTS

| | | |
|---|---|---|
| EP | 1 036 927 A | 9/2000 |
| JP | 2000-073744 A | 3/2000 |
| JP | 2001-227333 A | 8/2001 |

* cited by examiner

*Primary Examiner*—Binh Q. Tran
(74) *Attorney, Agent, or Firm*—Foley & Lardner LLP

(57) ABSTRACT

Removal of poisoning substance (sulfur oxidant) is controlled based upon estimating an amount of the poisoning substance deposited in an exhaust gas purification catalyst disposed in an exhaust pipe for an internal combustion engine, a lower limit is set corresponding to a possible removal amount of the poisoning substance varying with a state of a catalyst, and the removal control of the poisoning substance is ended when the estimated amount is less than the lower limit.

The estimated amount can be accurately calculated, thereby ending the removal control at a proper timing. Fuel economy and exhaust gas purification performance improves.

14 Claims, 17 Drawing Sheets

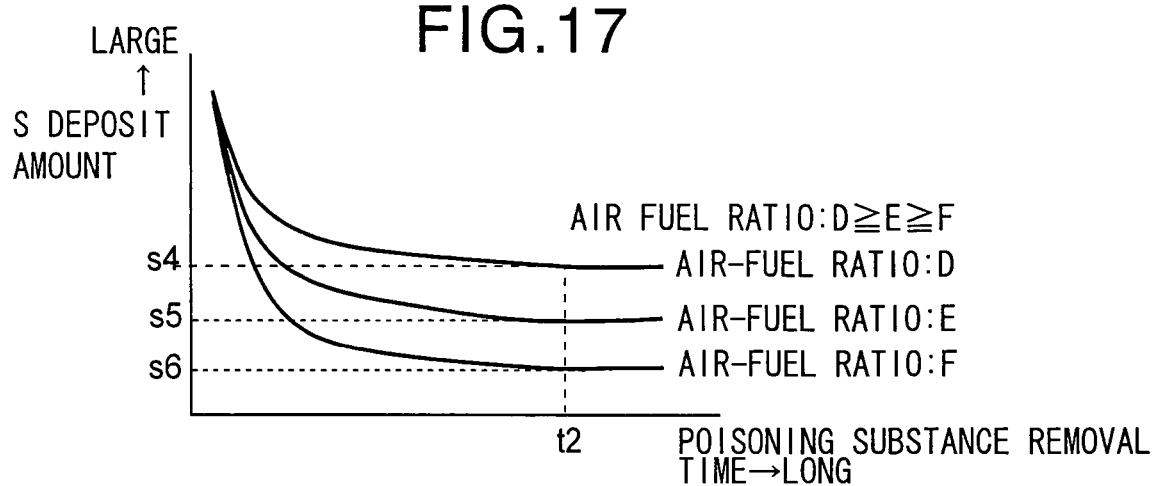
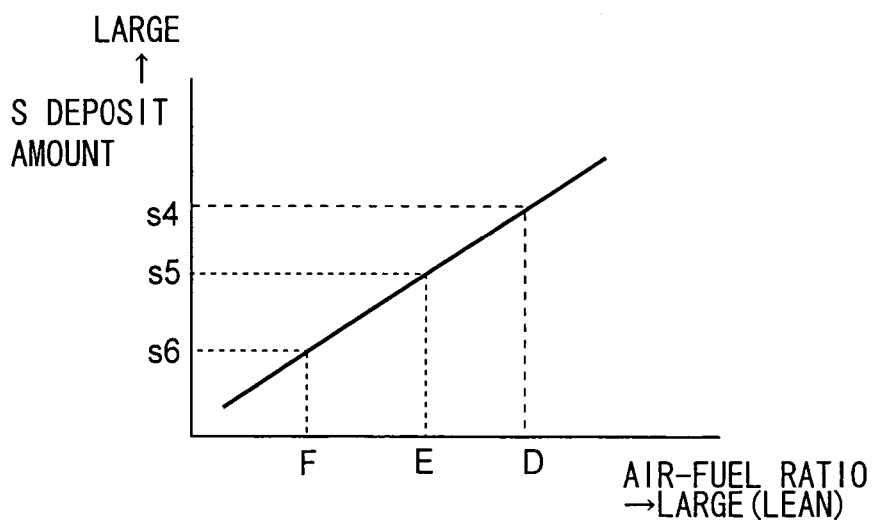

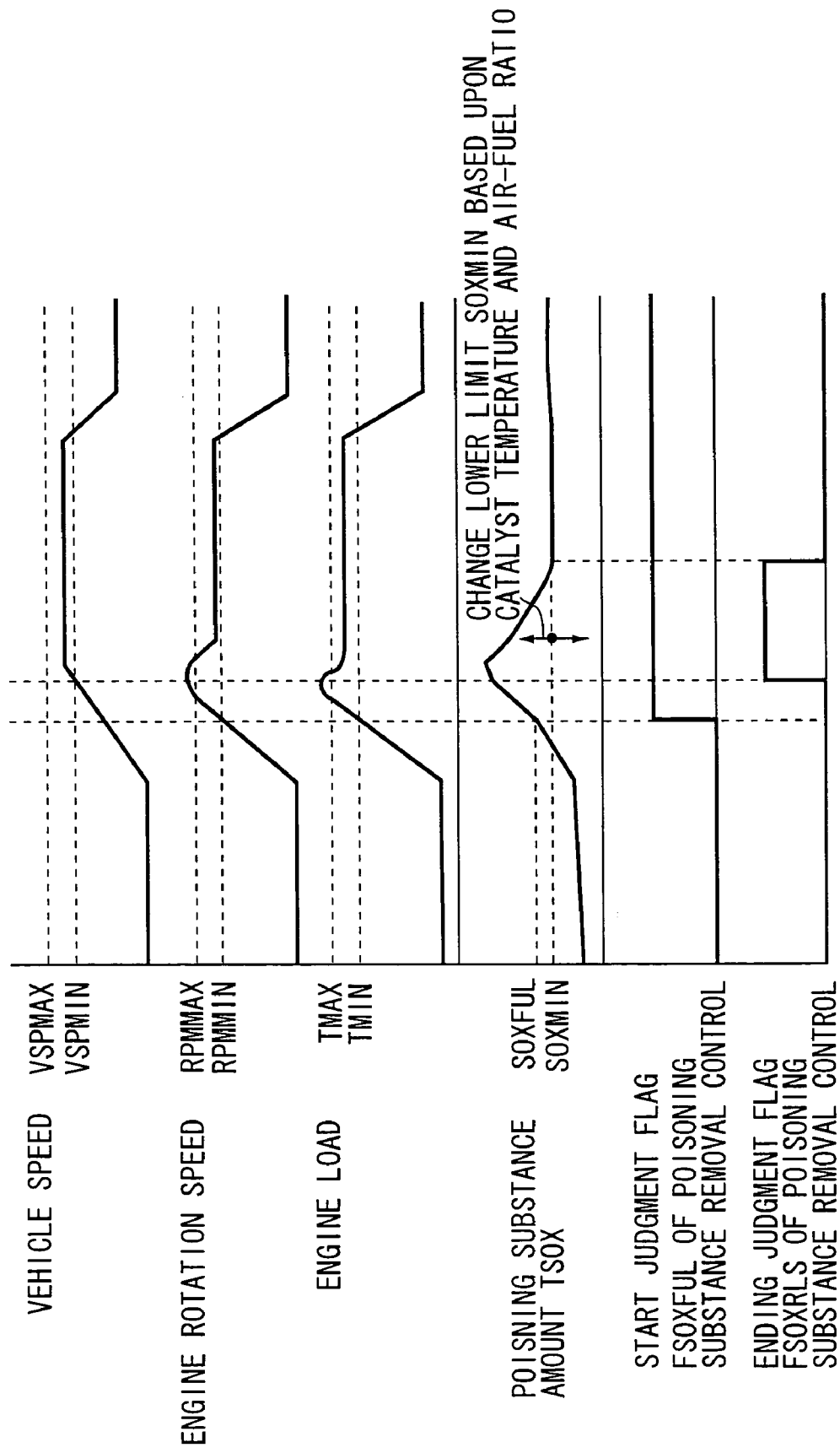

EXHAUST GAS PURIFYING APPARATUS AND METHOD FOR INTERNAL COMBUSTION ENGINE

BACKGROUND OF THE INVENTION

1. Field of the Invention

This invention relates to an apparatus and a method for purifying an exhaust gas in an internal combustion engine and in particular, for estimating an amount of poisoning substance deposited in an exhaust gas purification catalyst during controlling removal of the poisoning substance.

2. Related Art of the Invention

There is known an apparatus for estimating an amount of poisoning substance (sulfur) deposited in an exhaust gas purification catalyst to remove the poisoning substance that is disclosed in a Japanese Unexamined Patent Publication No. 2001-227333 and 2000-73744.

The Publication No. 2001-227333 discloses that removal control of the poisoning substance to make an air-fuel ratio to be in a rich range is carried out for a predetermined period and thereafter, the removal control ends.

However, a relation between a temperature of a catalyst and a poisoning substance regeneration rate is not factored in for the removal control and as a result, the amount of the poisoning substance is not accurately estimated. Therefore, the removal control ends regardless of incomplete removal or continues to be carried out regardless of complete removal, causing deterioration of fuel economy and exhaust gas emission performance.

The Publication No. 2000-73744 discloses that an amount of a poisoning substance is estimated by subtracting a removal amount of the poisoning substance calculated based upon an engine operating condition in a predetermined period after the removal control starts.

Therefore, the amount is finally estimated as 0 depending on the elapse time wherein it is not factored in that the removal amount of the poisoning substance has a limitation depending on a catalyst temperature and an air-fuel ratio and as a result, the amount of the poisoning substance is not estimated accurately.

Accordingly, ending the poisoning substance removal control is too early and too long, causing deterioration of fuel economy and exhaust gas emission performance.

SUMMARY OF THE INVENTION

The present invention, in view of the foregoing problems, provides an apparatus that removes poisoning substance based upon accurately estimating an amount of the poisoning substance deposited during controlling removal thereof.

As one aspect of the present invention, in order to solve the above problems, poisoning substance removal is controlled based upon estimating an amount of poisoning substance deposited in an exhaust gas purification catalyst, a lower limit is set corresponding to a possible removal amount of the poisoning substance, the possible removal amount varying with a state of a catalyst, and control of the poisoning substance removal is ended when the estimated amount is less than the lower limit.

These and other aspects, and features of this invention will be understood from the following description with accompanying drawings.

BRIEF EXPLANATION OF THE DRAWINGS

FIG. 17 is a view showing a relation of an air-fuel ratio and a poisoning substance amount (amount S) to an elapse time after a poisoning substance removal control starts.

FIG. 18 is a table showing a relation between a catalyst temperature and a poisoning substance amount (amount S) in a predetermined time t2 after a poisoning substance removal control starts.

FIG. 19 is a time chart showing a state of the poisoning substance removal during controlling the removal.

DETAILED EXPLANATION OF THE PREFERRED EMBODIMENTS

Figure 1:
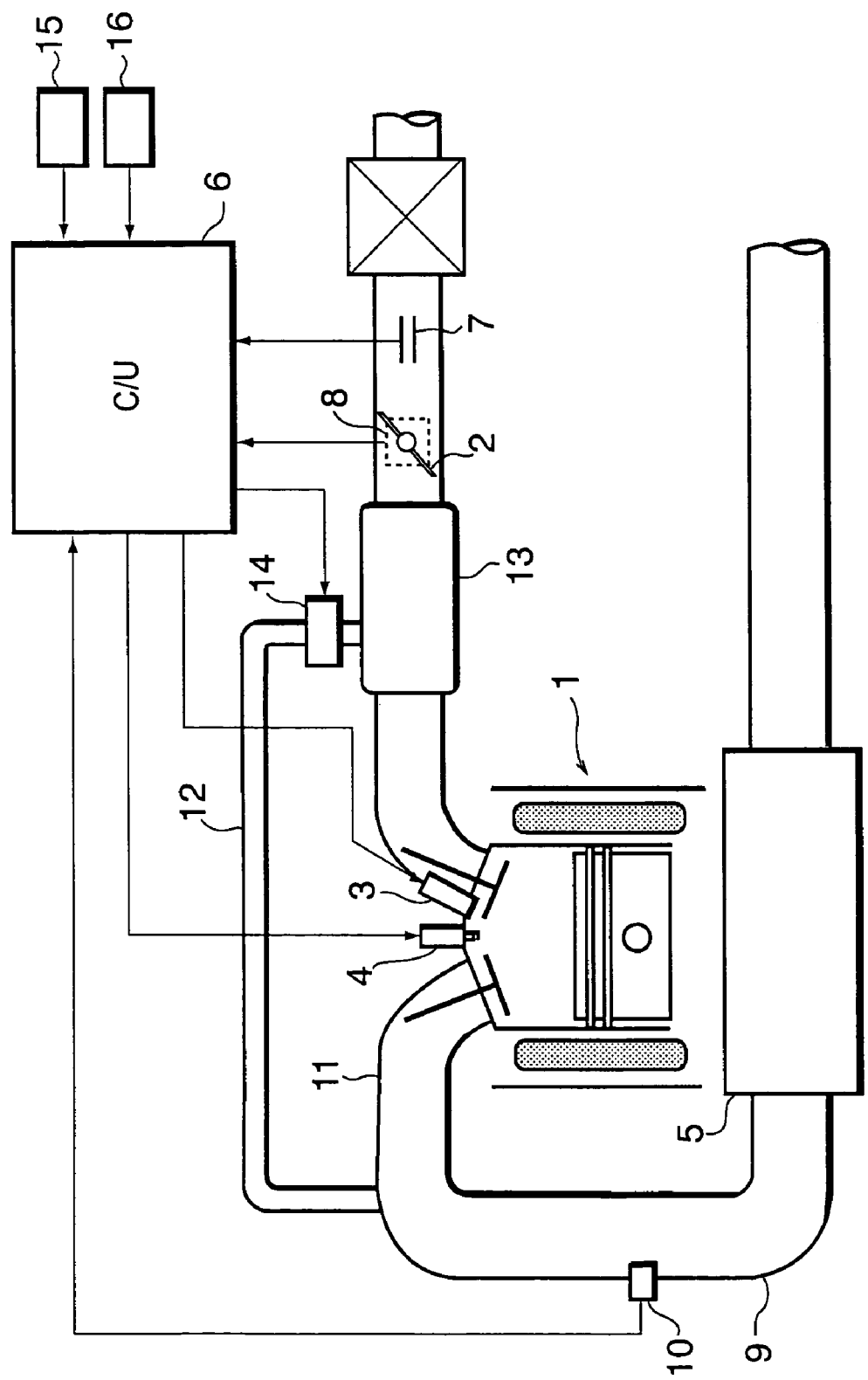
FIG. 1 is a system view in an internal combustion engine common in each embodiment according to the invention.

Embodiments according to the invention will be explained with reference to the drawings. FIG. 1 is a system view of an internal combustion engine 1 where air measured by a throttle valve 2 is aspired and the air is mixed with fuel injected into a combustion chamber by a fuel injector 3, forming a mixture therein. Fuel injector 3 may injects fuel into an intake port.

The mixture formed in the combustion chamber is fired by an ignition plug 4 and a combustion exhaust gas is purified in a NOx trap catalyst 5 disposed in an exhaust pipe 9 and thereafter, is emitted into an atmosphere. NOx trap catalyst 5 is a three-way catalyst that traps NOx in an exhaust gas when an air-fuel ratio is in a lean range, and discharges and reduces the trapped NOx when the air-fuel ratio is in a stoichiometric value or a rich range.

A control unit (controller) 6 that controls injection timing and an injection amount of fuel injector 3, and ignition timing of ignition plug 4 includes a microcomputer. Controller 6 outputs a fuel injection signal to fuel injector 3 and an ignition signal to ignition plug 4 by calculation based upon signals from various sensors.

In calculation of the fuel injection signal a target air-fuel ratio is determined based upon an engine operating condition, and a fuel injection amount (injection pulse width) is calculated so that a mixture of the target air-fuel ratio is formed wherein as the target air-fuel ratio, the air-fuel ratio is set leaner than a stoichiometric value and engine 1 operates in so-called-lean burning driving. The trapped NOx in the exhaust gas is saturated as engine 1 operates long in the lean burning driving. Accordingly, on a regular basis or when the NOx trap amount is estimated as more than a predetermined value in the lean burning driving, the trapped NOx is discharged by forcibly making an air-fuel ratio to be in a rich range and is reduced in a three-way catalyst layer and thereby, a NOx trapping ability of catalyst 5 recovers.

The various sensors includes an airflow meter 7 that detects an intake air flow amount of engine 1, a throttle sensor 8 that detects an opening angle of throttle valve 2, an air-fuel-ratio sensor 10 disposed in exhaust pipe 9 upstream of Nox trap catalyst 5 to detect an air-fuel ratio, a vehicle speed sensor 15 that detects a running velocity of a vehicle mounting engine 1, and a crank angle sensor 16 that outputs a rotation signal corresponding to a rotation speed of engine 1. Air-fuel-ratio sensor 10 detects an exhaust gas air-fuel ratio (air-fuel ratio hereinafter) based upon an oxygen density in the exhaust gas and may be a sensor that detects a stoichiometric value only.

Controller 6 sets an air-fuel-ratio feedback correction coefficient ALPHA by a proportional-differential control for correcting the fuel injection amount so that the air-fuel ratio detected by air-fuel-ratio sensor 10 gets close to a target air-fuel ratio. An EGR valve 14 recirculates part of the combustion exhaust gas from an exhaust manifold 11 through an EGR pipe 12 back to an intake collector 13 and controller 6 controls an exhaust gas recirculation rate by controlling EGR valve 14 corresponding to an engine operating condition.

Sulfur (sulfur oxidant SOx) contained in the fuel is easily deposited in NOx trap catalyst 5. When the sulfur amount increases, trap ability of NOx trap catalyst 5 deteriorates accordingly. Therefore, when the controller 6 estimates the sulfur amount deposited in NOX trap catalyst 5 and judges that the estimated sulfur amount goes beyond an allowance level, controller 6 carries out removal processing that discharges the sulfur oxidant SOx as poisoning substance from NOx trap catalyst 5.

Figure 2:
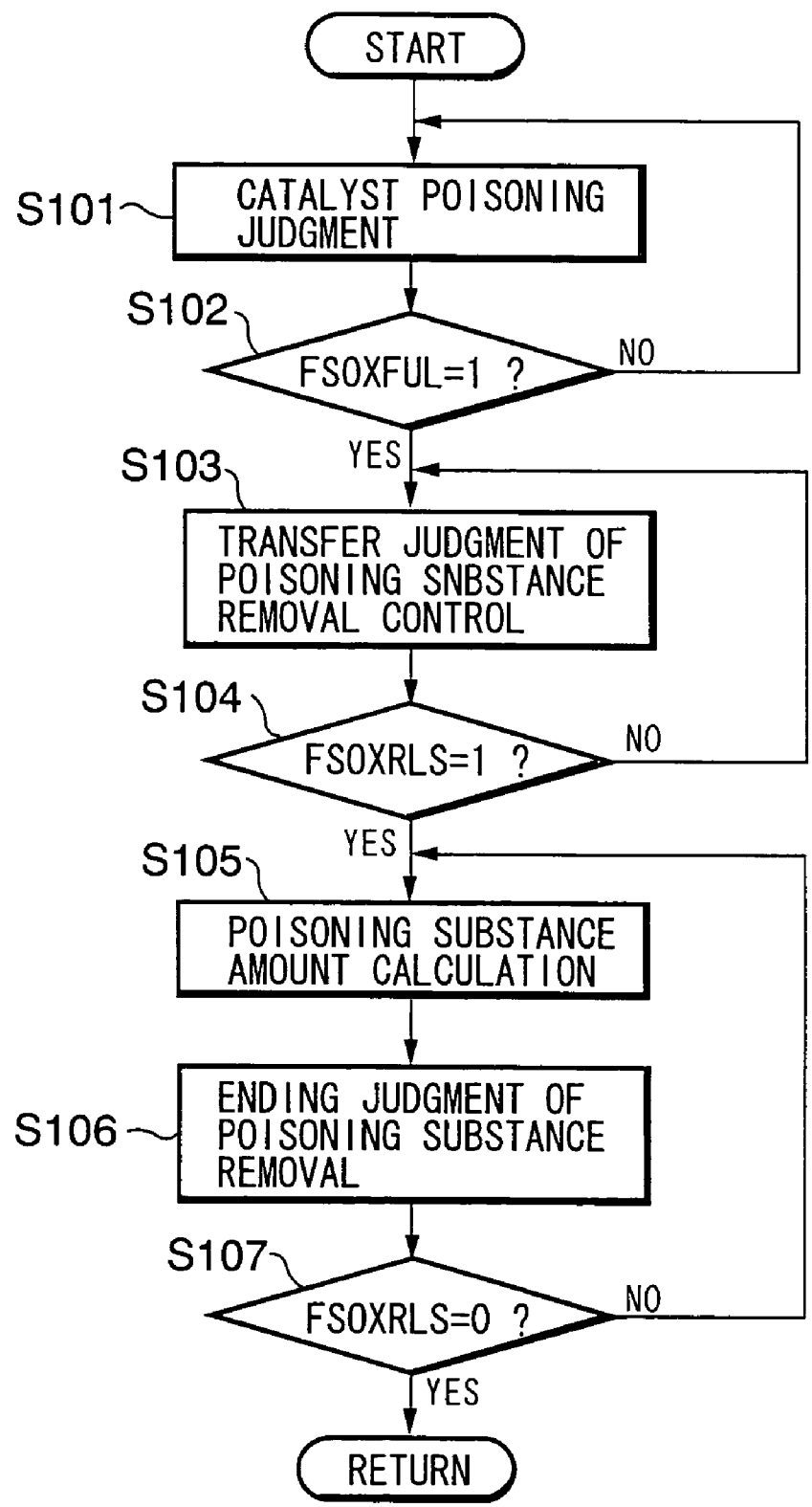
FIG. 2 is a flowchart of a main flow of removal control of poisoning substance.

A detail of estimation of sulfur amount and sulfur removal processing will be explained according to a flowchart in FIG. 2. FIG. 2 shows a main flow of poisoning substance removal control.

At S 101, a sulfur amount (poisoning substance amount hereinafter) deposited in NOx trap catalyst 5 is estimated and it is judged whether or not removal of the poisoning substance (poisoning removal hereinafter) is necessary. When the poisoning removal is judged to be necessary, flag FSOXFUL is set as 1 and when the poisoning removal is judged not to be necessary, flag SOXFUL is kept as 0.

At S 102, a value of the flag FSOXFUL is judged. When flag SOXFUL is 1, namely the poisoning removal is judged to be necessary, the process goes to S 103. At S 103, it is judged whether or not transfer to the poisoning removal control is possible based upon an engine operating condition. When the transfer is judged to be possible, flag FSOXFUL is set as 1 and when the transfer is judged not to be possible, flag FSOXFUL is kept as 0.

At S 104, a value of the flag FSOXRLS is judged. When flag SOXRLS is 1, namely the transfer to the poisoning removal control is judged to be possible, flag FSOXRLS is set as 1, the process goes to S 105.

At S 105, an amount of the poisoning substance, namely an estimated amount deposited in NOx trap catalyst 5 is calculated. At S 106, it is judged whether or not the poisoning removal control ends based upon the amount of the poisoning substance. When the poisoning removal control is judged to end, flag FSOXRSL is reset as 0 and when it is judged not to end, flag FSOXRSL is kept as 1.

At S 107 a value of flag FSOXRLS is judged. When flag FSOXRLS is judged to be 1, namely the poisoning removal control is judged to end, the routine ends and the poisoning removal control ends.

Figure 3:
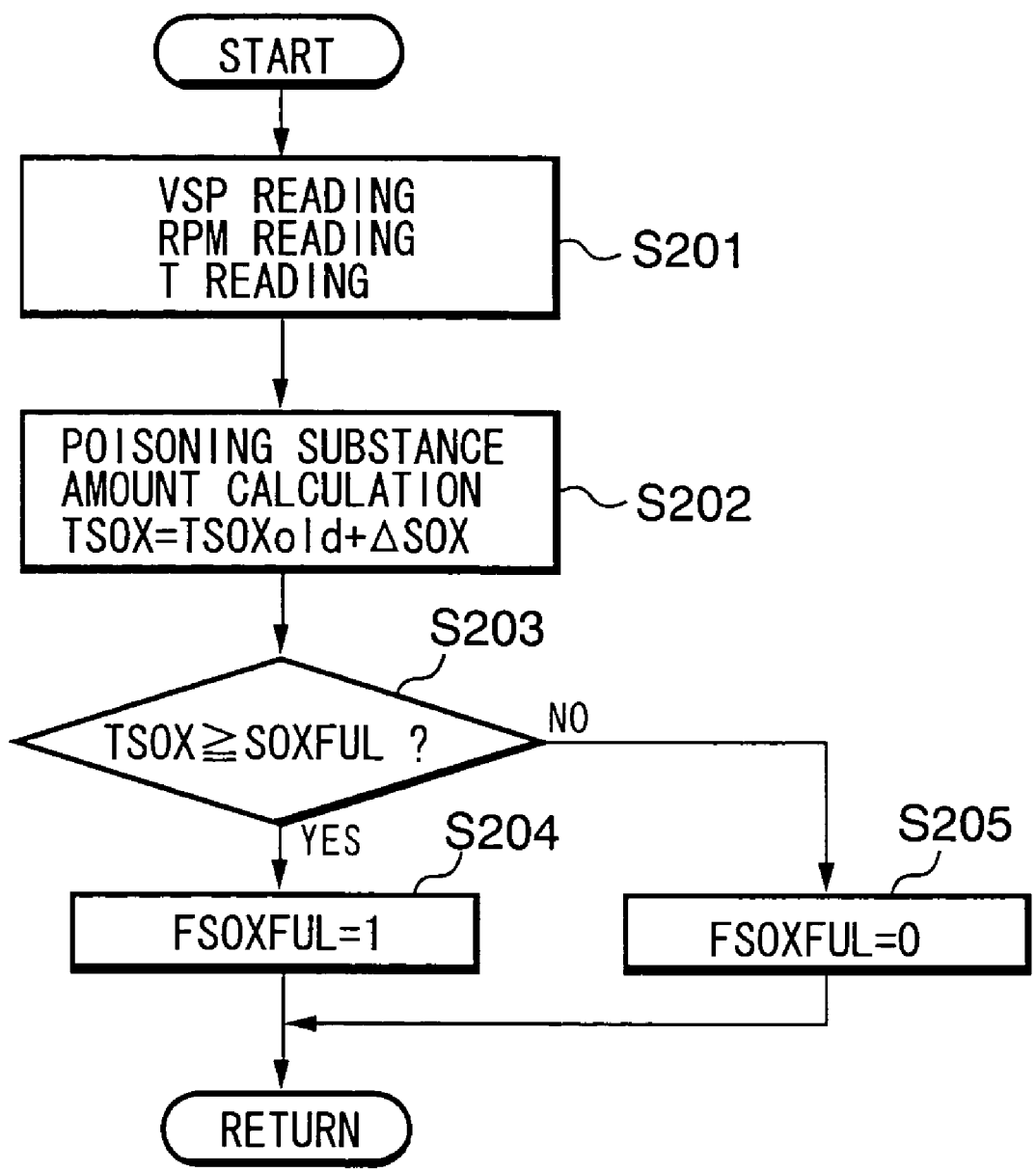
FIG. 3 is a flowchart for judging a poisoning substance amount to determine start of the removal control.

FIG. 3 shows a flowchart of judgment of poisoning removal timing at S 101 in FIG. 2. At S 201, a vehicle speed (VSP), an engine rotation speed (RPM) and an engine load (T) are read as an engine operating condition.

At S 202, an amount ΔSOX per unit time in NOx trap catalyst 5 is integrated based upon the engine operating condition. At S 203, when the integrated amount TSOX and the judgment amount of the poisoning substance SOXFUL are compared and it is judged that TSOX≧SOXFUL, it is judged that the amount reaches an amount for which the poisoning removal control is demanded and the process goes to S 204 wherein poisoning removal demand is set by setting flag FSOXFUL=1.

When it is judged that TSOX<SOXFUL at S 203, the process goes to S 205 wherein poisoning removal demand is rejected by setting flag FSOXFUL=0.

Figure 4:
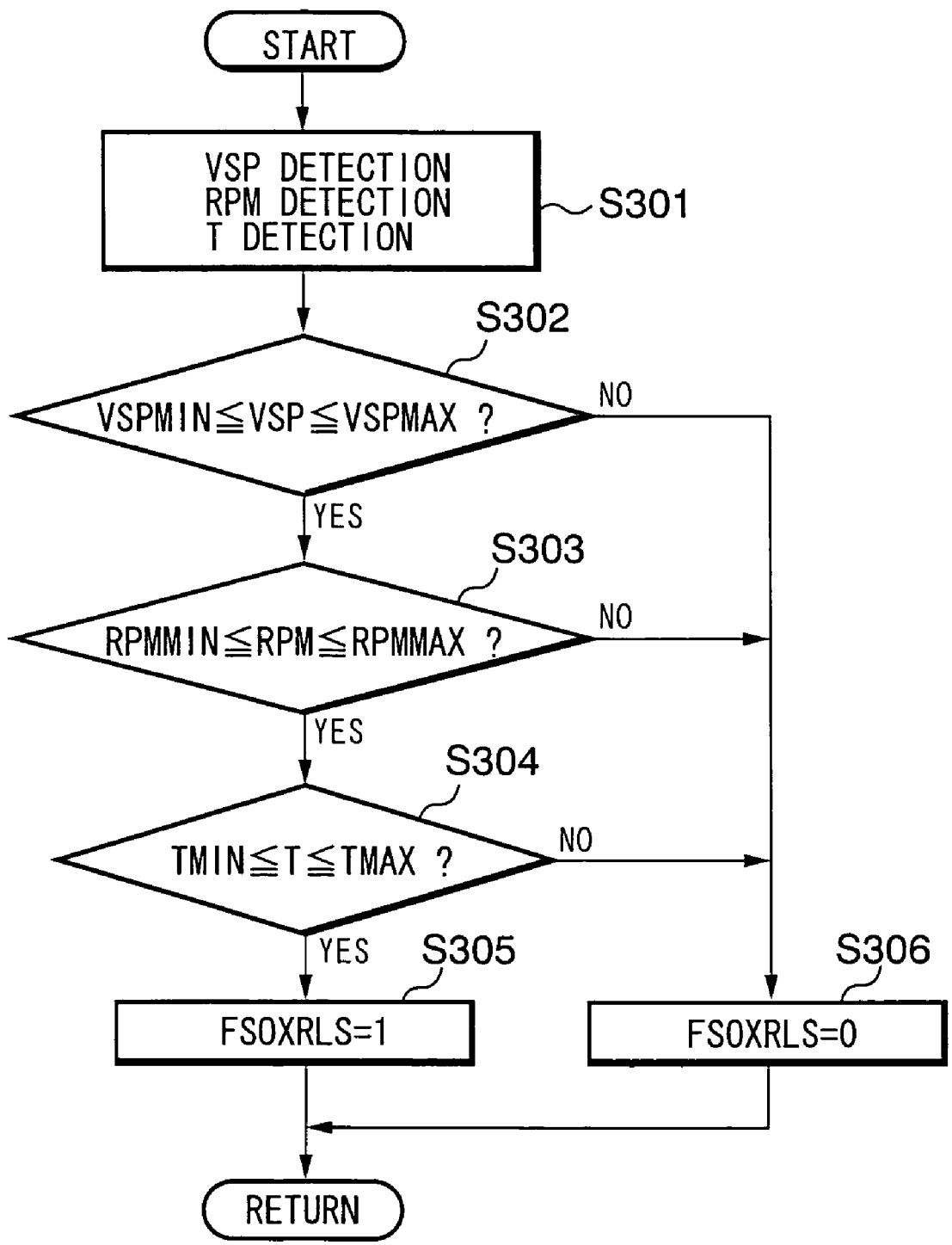
FIG. 4 is a flowchart for judging transfer to the removal control.

FIG. 4 shows a flowchart of transfer judgment to poisoning removal control at S 103 in FIG. 2. At S 301, a vehicle speed (VSP), an engine rotation speed (RPM) and an engine load (T) are read as an engine operating condition. At S 302, 303, and 304, it is judged whether or not the vehicle speed, the engine rotation speed, the engine load respectively are, in turn, within a region where the transfer to the poisoning removal control is possible. When all the conditions are judged to be within the region, at S 305, poisoning removal execution flag FSOXRLS is set as 1 and the poisoning removal control execution is permitted. When each of the conditions at S 302, 303 or 304 is rejected, at S 306 the poisoning removal execution flag FSOXRLS is set as 0 and the poisoning removal execution is rejected.

Figure 5:
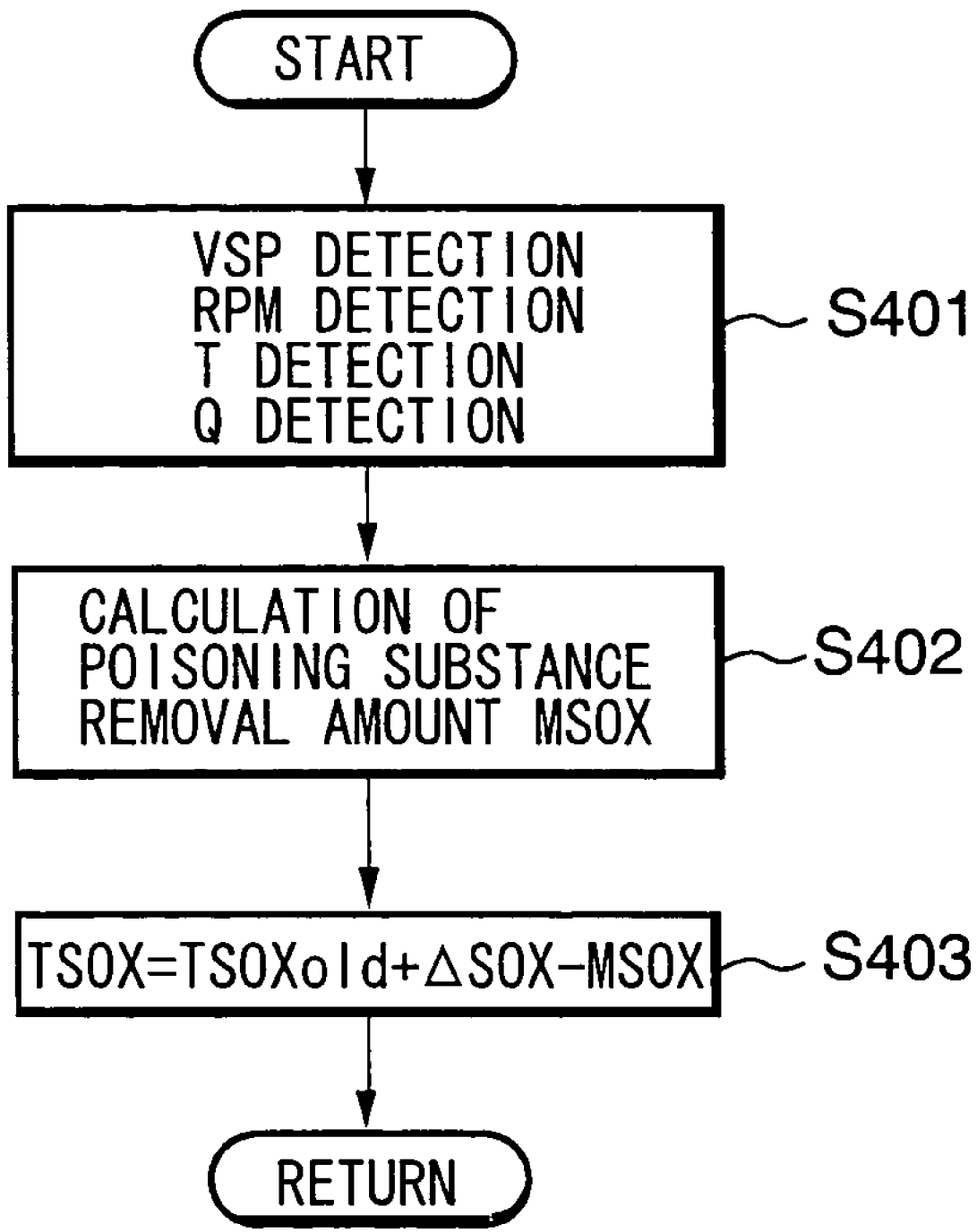
FIG. 5 is a flowchart for calculating the poisoning substance amount during controlling removal thereof.

FIG. 5 shows a flowchart of calculation of poisoning substance amount during controlling the poisoning removal at S 105 in FIG. 2. At S 401, a vehicle speed (VSP), an engine rotation speed (RPM), an engine load (T) and an intake air amount (Q) are read as an engine operating condition.

At S 402, a poisoning removal amount MSOX per unit time in NOx trap catalyst 5 is calculated based upon the engine operating condition. At S 403, a poisoning amount TSOX is calculated according to the following equation.

$$TSOX = TSOXold + \Delta SOX - MSOX.$$

TSOXold: a previous calculation value of the amount TSOX

The poisoning removal amount MSOX is an extremely large value compared with the amount ΔSOX during controlling the poisoning removal and as a result, TSOX is subtracted.

Ending judgment of the poisoning removal control using a lower limit of the amount of the poisoning substance according to the invention at S 106 in FIG. 2 will be explained as follows. When the amount TSOX calculated in a flowchart in FIG. 5 reaches a lower limit calculated based upon a catalyst temperature and an air-fuel ratio during controlling the poisoning removal and is limited not to be subtracted any more, it is judged to be ending timing of the poisoning removal control.

Figure 6:
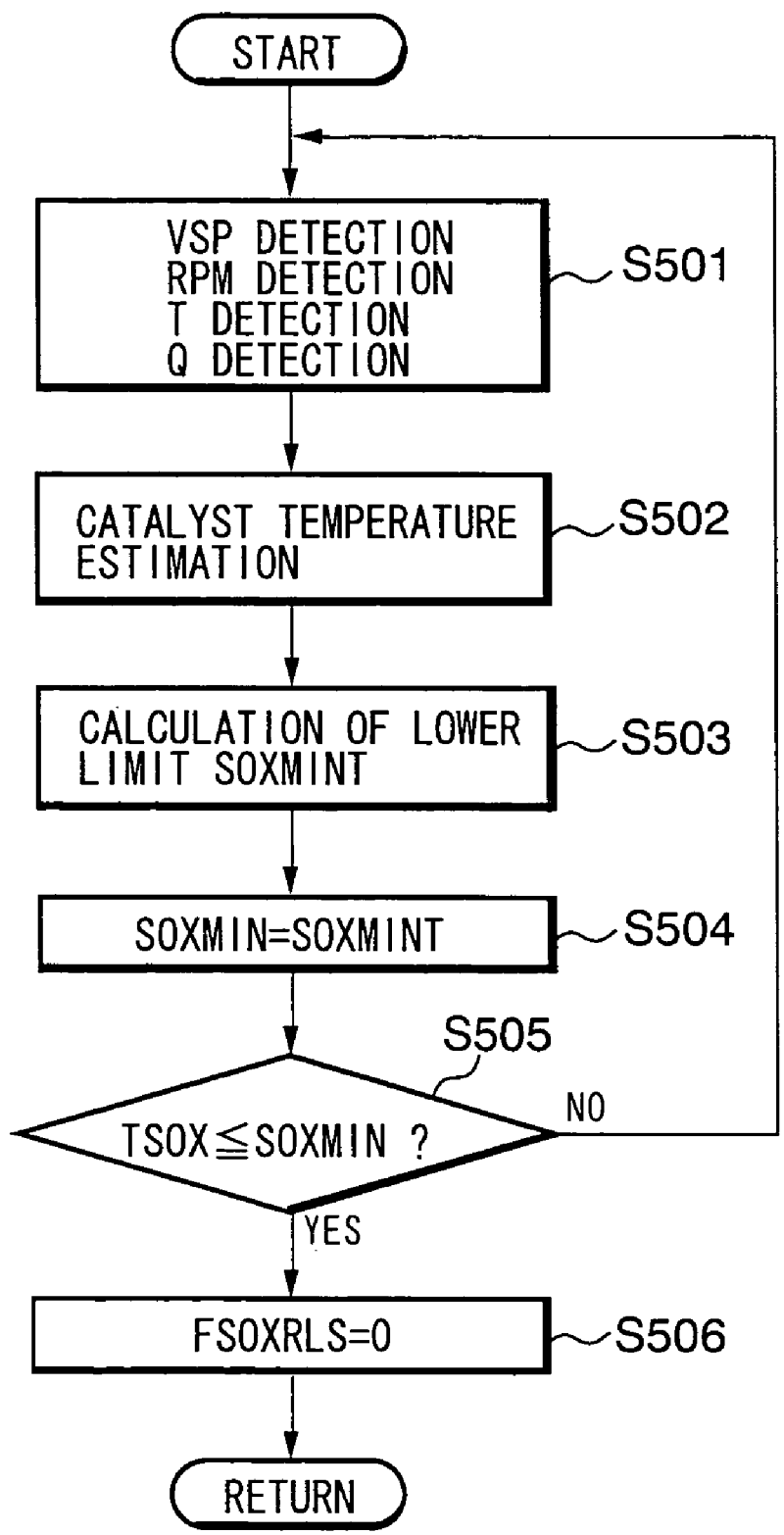
FIG. 6 is a flowchart for judging ending the removal control by calculating a lower limit based upon a catalyst temperature.

FIG. 6 shows a flowchart determining ending judgment of the poisoning removal control by calculating the lower limit based upon the catalyst temperature.

At S 501, a vehicle speed (VSP), an engine rotation speed (RPM), an engine load (T), and an intake air amount (Q) are read as an engine operating condition.

At S 502, the catalyst temperature is estimated based upon the engine operating condition. The catalyst temperature may be estimated from an exhaust temperature detected by a temperature sensor directly disposed in the catalyst or upstream or downstream thereof.

At S 503, the lower limit SOXMINT of the amount corresponding to the catalyst temperature estimated above is calculated. Namely when the catalyst temperature is high, sulfur discharge rate becomes so high that a possible removal amount of the poisoning substance is large. On the other hand, as the catalyst temperature gets lower, the sulfur discharge rate gets small to reduce the possible removal amount. Therefore, the lower limit SOXMINT is calculated as small when the catalyst temperature is high and as large when the catalyst temperature is low. As described above, the possible removal amount for a particular state of the exhaust gas purification catalyst is the amount of the poisoning substance below which no more poisoning substance can be removed from the exhaust gas purification catalyst at the particular state of the exhaust gas purification catalyst.

At S 504, the lower limit value SOXMINT is set as an ending judgment value SOXMIN of the poisoning removal control. At S 505, the amount TSOX calculated at S 403 in FIG. 5 is compared with the ending judgment value SOXMIN. When it is judged that TSOX>SOXMIN, the poisoning removal control keeps on going and the process goes back to S 501 wherein the ending judgment routine is made repeatedly. When it is judged that TSOX≦SOXMIN, the process goes to S 506 wherein the poisoning removal control ends by setting that flag SOXRLS=0.

Accordingly, an estimated amount is accurately calculated and as a result, the poisoning removal control ends at a proper time, thereby improving a fuel economy and an exhaust gas emission performance.

In particular, in the above embodiment the lower limit is set based upon the catalyst temperature of NOx trap catalyst 5 during controlling the poisoning removal and thereby, the amount at a point of ending the poisoning removal control varying with the catalyst temperature can be accurately estimated.

Figure 7:
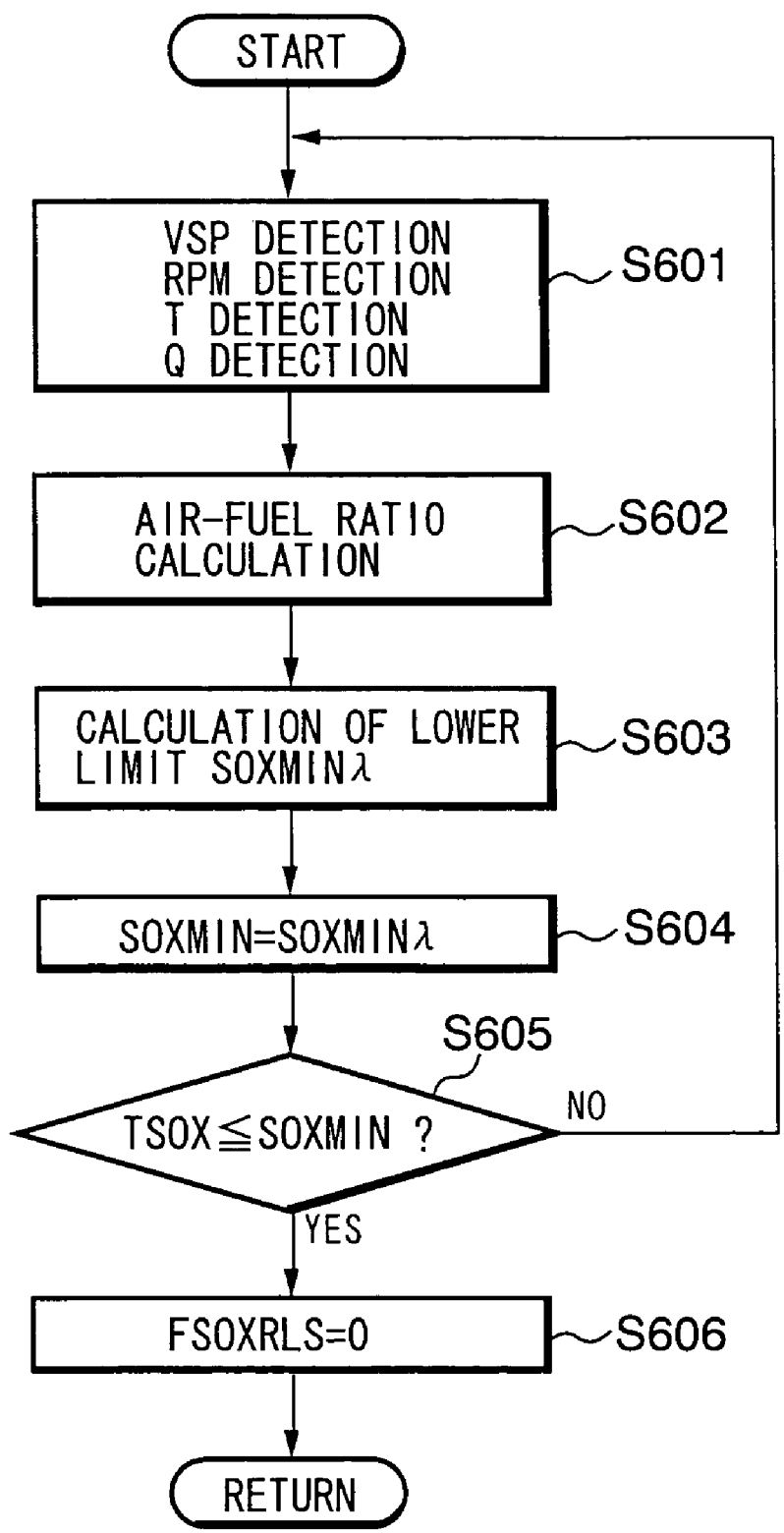
FIG. 7 is a flowchart for judging ending the removal control by calculating a lower limit based upon an air-fuel ratio.

FIG. 7 shows a flowchart determining ending judgment of the poisoning removal control by calculating a lower limit based upon an air-fuel ratio.

At S 601, a vehicle speed (VSP), an engine rotation speed (RPM), an engine load (T), and an intake air amount (Q) are read as an engine operating condition.

At S 602, the air-fuel ratio is estimated based upon the engine operating condition. The air-fuel ratio may be estimated from output of an oxygen sensor or an air-fuel-ratio sensor of a wide range type disposed upstream or downstream of the catalyst.

At S 603, a lower limit SOXMINλ of the poisoning amount corresponding to the air-fuel ratio estimated above is calculated. Namely the air-fuel ratio is controlled to be in a rich range during controlling the poisoning removal and as a result, as the air-fuel ratio is richer, the sulfur discharge rate becomes so high that a possible removal amount of the poisoning substance is large. On the other hand, as richness degree of the air-fuel ratio gets lower, the sulfur discharge rate gets small to reduce the possible removal amount. Therefore, the lower limit SOXMINλ is calculated as small when the air-fuel ratio is richer and as large when the richness degree of the air-fuel ratio is low.

In the same as in FIG. 6, At S 604, the lower limit value SOXMINλ is set as an ending judgment value SOXMIN of the poisoning removal control. At S 605, the amount TSOX is compared with the ending judgment value SOXMIN. When it is judged that TSOX≦SOXMIN, the process goes to S 606 wherein the poisoning removal execution ends by setting that flag SOXRLS=0.

In the above embodiment the lower limit is set based upon the air-fuel ratio during controlling the poisoning removal and thereby, the amount at a point of ending the poisoning removal control varying with the air-fuel ratio can be accurately estimated.

Figure 8:
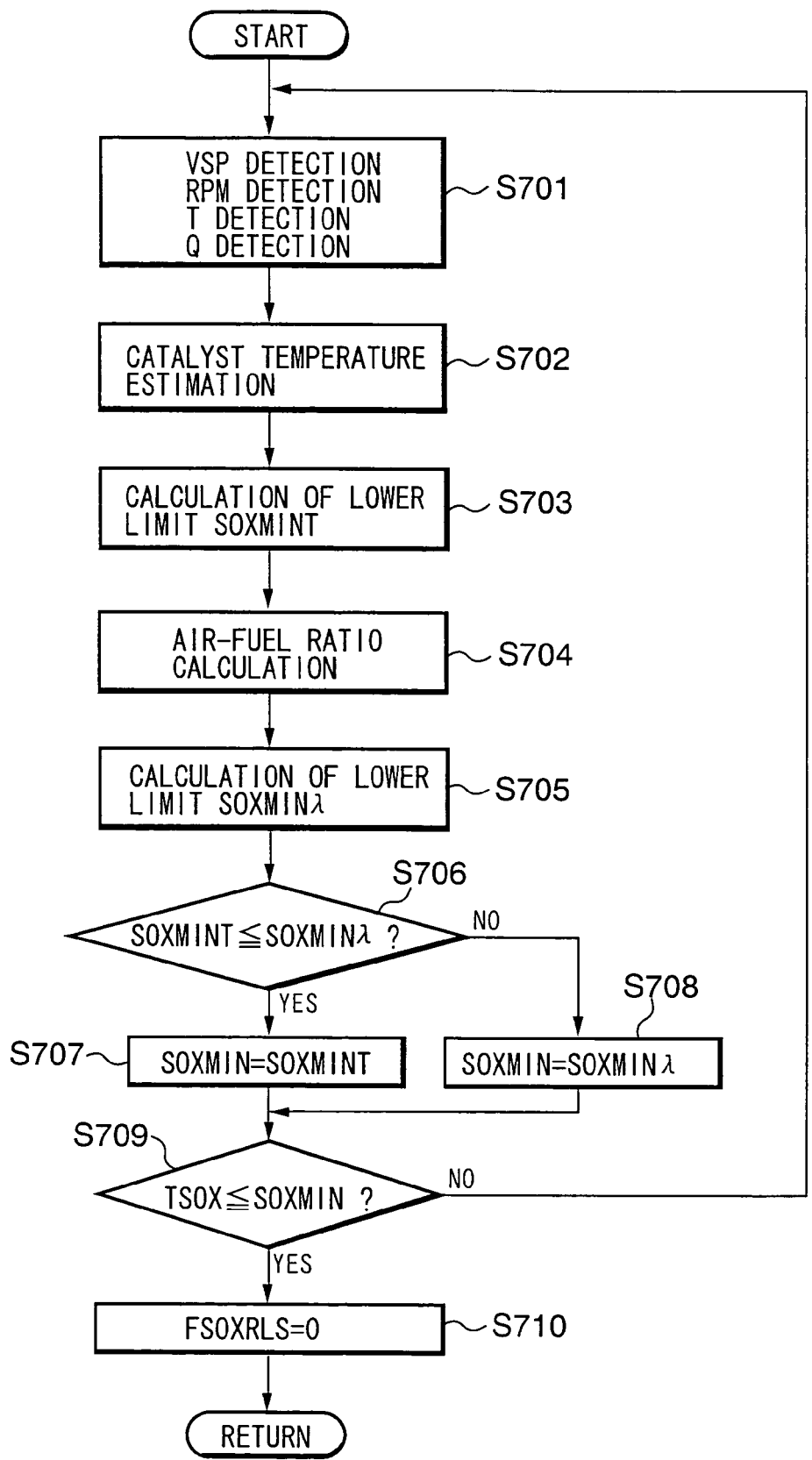
FIG. 8 is a flowchart for judging ending the removal control by calculating a lower limit based upon the catalyst temperature and the air-fuel ratio.

FIG. 8 shows a flowchart determining ending judgment of the poisoning removal control by calculating a lower limit based upon both a catalyst temperature and an air-fuel ratio during controlling the poisoning removal.

At S 701, a vehicle speed (VSP), an engine rotation speed (RPM), an engine load (T), and an intake air amount (Q) are read as an engine operating condition.

At S 702–705, in the same way as in FIGS. 6 and 7, the catalyst temperature is estimated based upon the engine operating condition.

The lower limit SOXMINT of the amount corresponding to the catalyst temperature estimated above is calculated and the air-fuel ratio is estimated based upon the engine operating condition. The lower limit SOXMINλ of the amount corresponding to the air-fuel ratio estimated above is calculated.

At S 706, the lower limit value SOXMINT corresponding to the catalyst temperature is compared with the lower limit value SOXMINλ corresponding to the air-fuel ratio. When SOXMINT≦SOXMINλ, the process goes to S 707 wherein the ending judgment value of the poisoning removal control SOXMIN=SOXMINT. When SOXMINT>SOXMINλ, at S 708 SOXMIN=SOXMINλ. Namely the smaller lower limit out of SOXMINT and SOXMINλ is chosen as the ending judgment value SOXMIN of the poisoning removal control.

Following S 709, in the same as in FIGS. 6, 7, the amount TSOX is compared with the ending judgment value SOXMIN. When it is judged that TSOX≦SOXMIN, the poisoning removal execution ends by setting that flag SOXRLS=0.

According to the above embodiment, the lower limit SOXMINT corresponding to the catalyst temperature of NOx trap catalyst 5 and the lower limit SOXMINλ corresponding to the air-fuel ratio are set separately and the smaller lower limit thereof is set as a final lower limit. Thereby, the amount at a point of ending the poisoning removal control varying with both the catalyst temperature and the air-fuel ratio can be accurately estimated.

An embodiment of a detailed calculation regarding the lower limit SOXMINT corresponding to a catalyst temperature of NOx trap catalyst 5 and the lower limit SOXMINλ corresponding to an air-fuel ratio will be explained.

Figure 9:
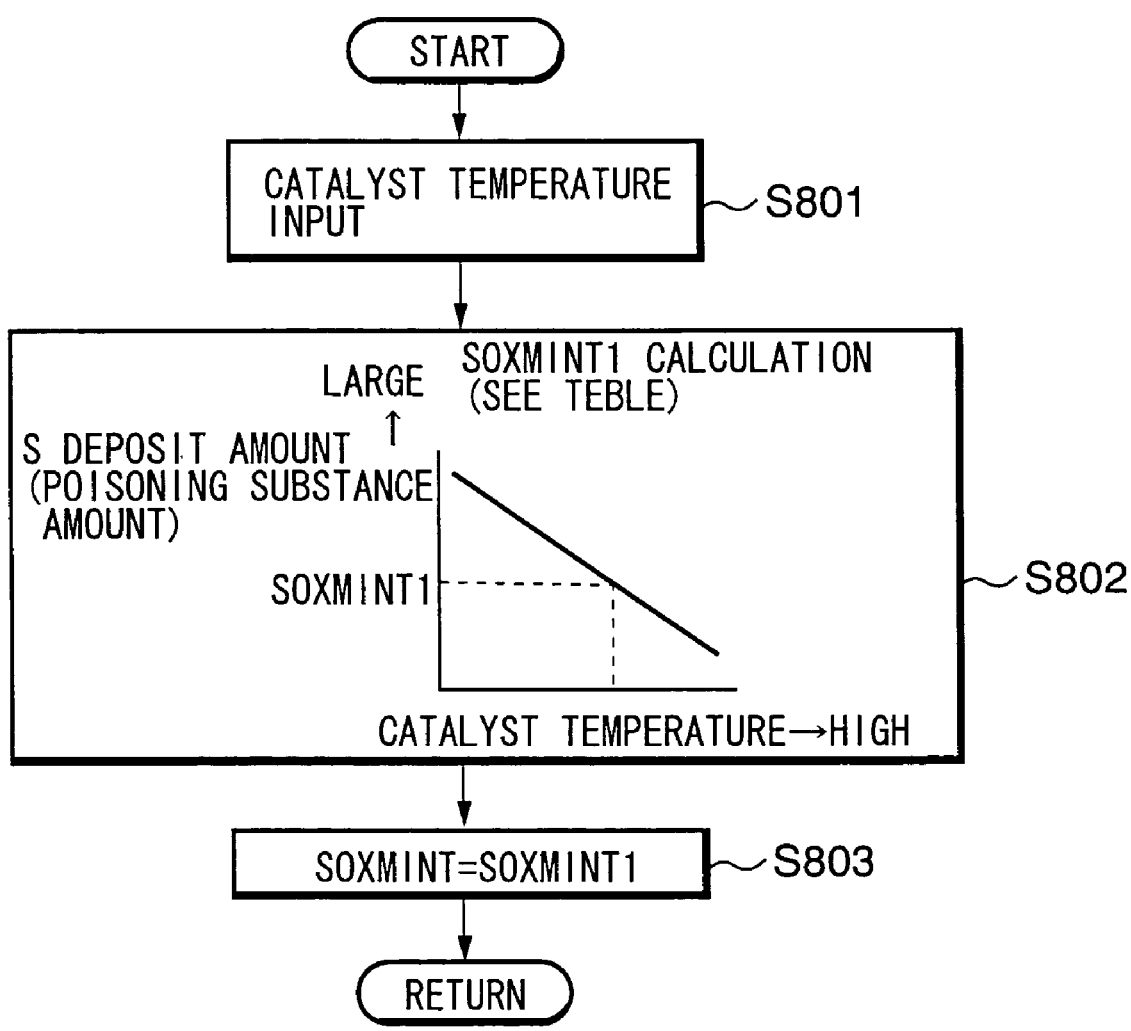
FIG. 9 is a flowchart showing a first embodiment calculating a lower limit based upon a catalyst temperature.

FIG. 9 shows an embodiment of calculation of the lower limit SOXMINT corresponding to a catalyst temperature. At S 801, a catalyst temperature is input and at S 802, an amount of poisoning substance SOXMINT1 is retrieved from a table based upon the catalyst temperature.

Figure 15:
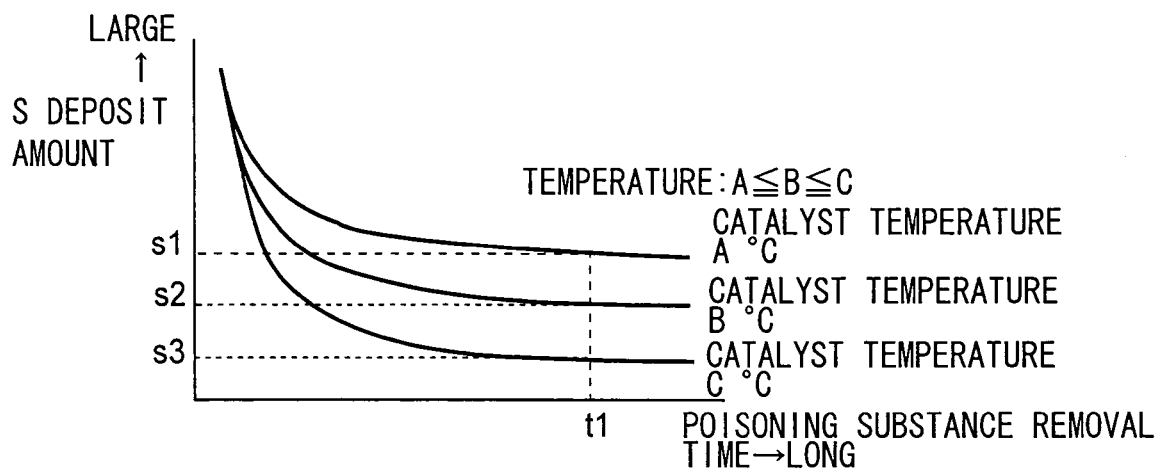
FIG. 15 is a view showing a relation of a catalyst temperature and a poisoning substance amount (amount S) to an elapse time after a poisoning substance removal control starts.
Figure 16:
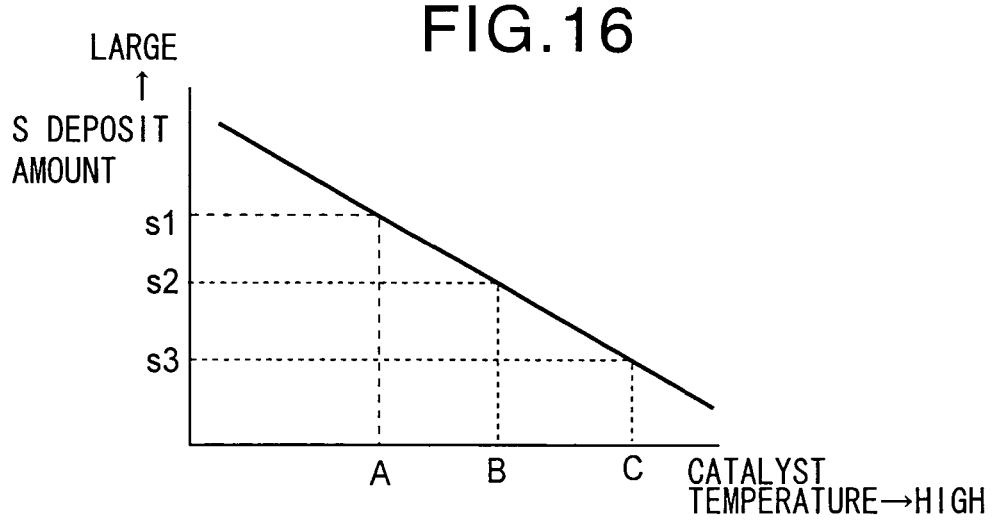
FIG. 16 is a table showing a relation between a catalyst temperature and a poisoning substance amount (amount S) in a predetermined time t1 after a poisoning substance removal control starts.

The table is a table in FIG. 16 showing a relation between a catalyst temperature and an amount of poisoning substance (amount S) for a predetermined time t1 (10–15 min) based upon a relation between the catalyst temperature and the amount shown in FIG. 15 and the predetermined time t1 after the poisoning removal control starts is set as a period of time leading to the following event. Namely even if the poisoning removal control continues to be carried out after an elapse of t1, the amount does not change substantially and is kept in equilibrium. Data (s1, s2, s3) of the amount for a predetermined time substantially depending only on the catalyst temperature are stored corresponding to the catalyst temperature (A, B, C). As described above, as the catalyst temperature is higher, the sulfur discharge rate becomes large and the possible removal amount becomes large, thereby making the amount of the poisoning substance to be small.

At 803, an amount (amount S) SOXMINT1 retrieved based upon the catalyst temperature from the table is set as a lower limit SOXMINT corresponding to the catalyst temperature.

Figure 10:
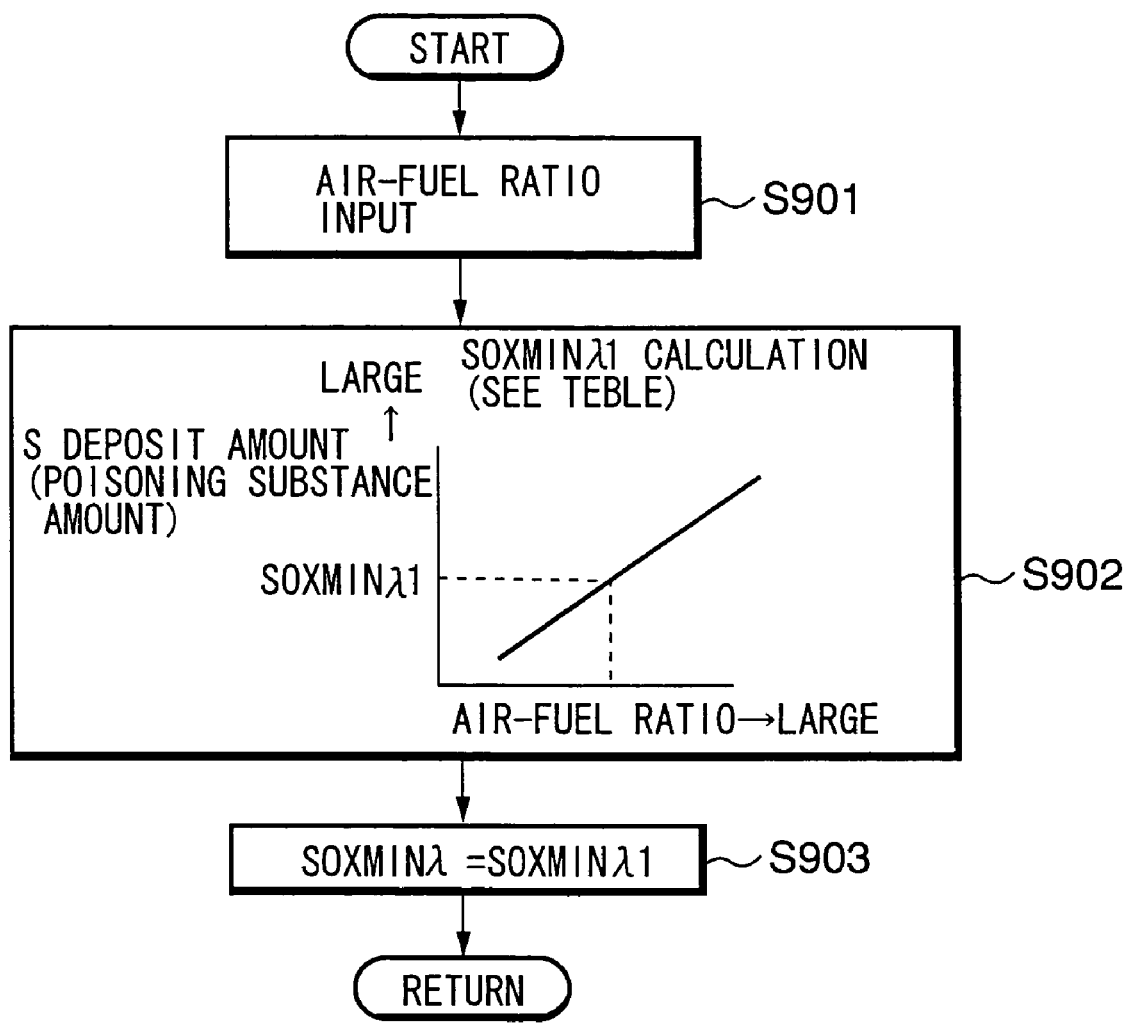
FIG. 10 is a flowchart showing the first embodiment calculating a lower limit based upon an air-fuel ratio.

FIG. 10 shows an embodiment of calculation of the lower limit SOXMINλ corresponding to an air-fuel ratio. At S 901, an air-fuel ratio is input and at S 902, an amount SOXMINλ1 is retrieved from a table based upon the air-fuel ratio.

The table is a table in FIG. 18 showing a relation between an air-fuel ratio and an amount (amount S) for a predetermined time t2 (10–15 min) based upon a relation between the air-fuel ratio and the amount shown in FIG. 17 and the predetermined time t2 after the poisoning removal control starts is set as a period of time leading to the following event. Namely even if the poisoning removal control continues to be carried out after an elapse of t2, the amount does not change substantially and is kept in equilibrium. Data (s4, s5, s6) of the amount for a predetermined time substantially depending only on the air-fuel ratio are stored corresponding to the air-fuel ratio (D, E, F). As described above, as the air-fuel ratio is richer, the sulfur discharge rate becomes large and the possible removal amount becomes large, thereby making the amount of the poisoning substance to be small.

Figure 11:
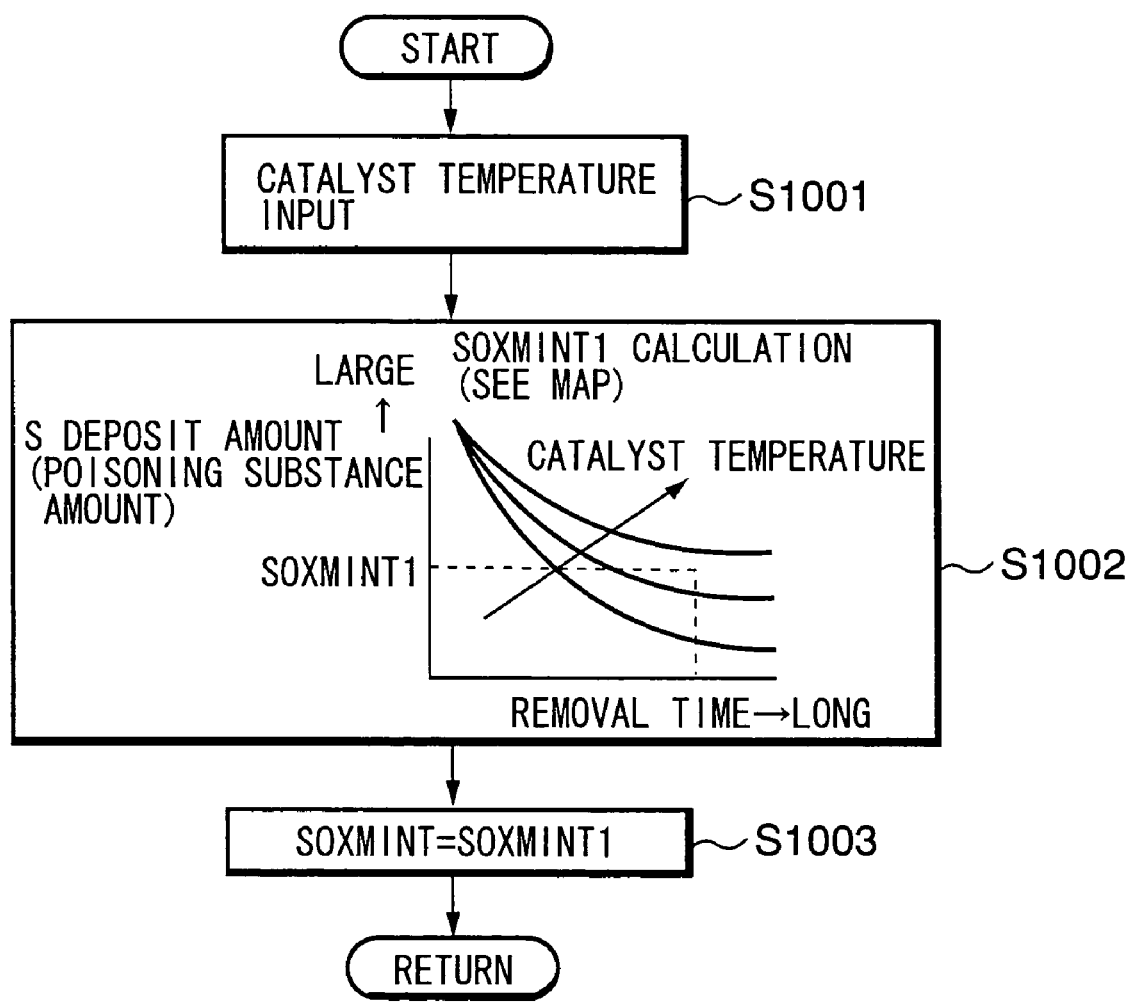
FIG. 11 is a flowchart showing a second embodiment calculating a lower limit based upon a catalyst temperature.

At 903, an amount (amount S) SOXMINλ1 retrieved based upon the air-fuel ratio from the table is set as a lower limit SOXMINλ corresponding to the air-fuel ratio FIG. 11 shows anther embodiment of calculation of the lower limit SOXMINT corresponding to a catalyst temperature. At S 1001, a catalyst temperature is input and at S 1002, an amount SOXMINT1 is retrieved from a map based upon the catalyst temperature.

The map stores data of the amount corresponding to the catalyst temperature based upon a relation between the catalyst temperature and the amount shown in FIG. 15.

At S 1003, an amount (amount S) SOXMINT1 retrieved based upon the catalyst temperature from the map is set as a lower limit SOXMINT corresponding to the catalyst temperature.

Figure 12:
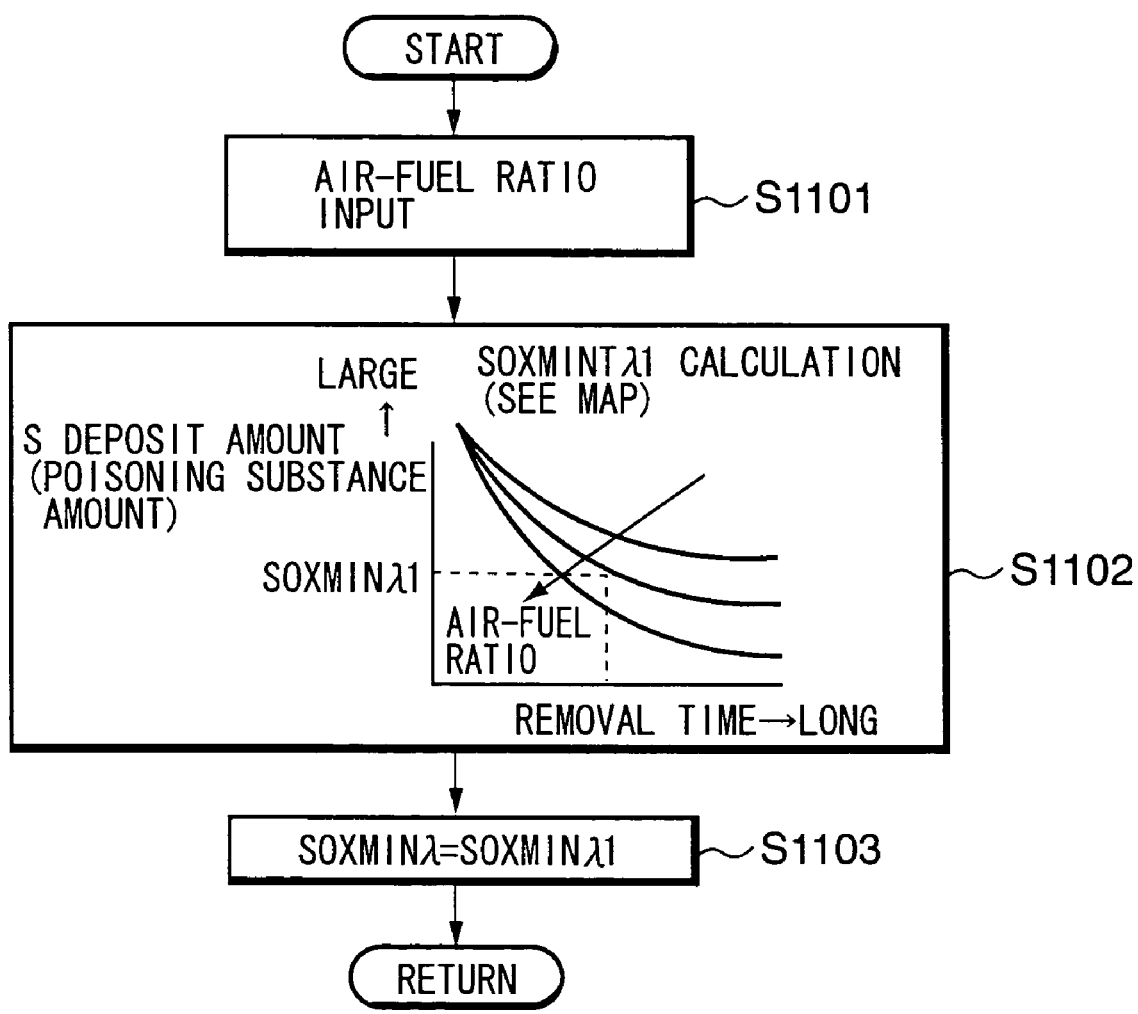
FIG. 12 is a flowchart showing the second embodiment calculating a lower limit based upon an air-fuel ratio.

FIG. 12 shows another embodiment of calculation of the lower limit SOXMIN λ corresponding to an air-fuel ratio. At S 1101, the air-fuel ratio is input and at S 1102, an amount SOXMINλ 1 is retrieved from a map based upon the air-fuel ratio.

The map stores data of the amount corresponding to the air-fuel ratio based upon a relation between the air fuel ratio and the amount shown in FIG. 17.

At S 1103, an amount (amount S) SOXMINλ1 retrieved based upon the air-fuel ratio from the map is set as a lower limit SOXMINλ corresponding to the air-fuel ratio.

As described above, the lower limit SOXMINT corresponding to the catalyst temperature and the lower limit SOXMINλ corresponding to the air-fuel ratio is easily set by a table retrieval or a map retrieval.

Figure 13:
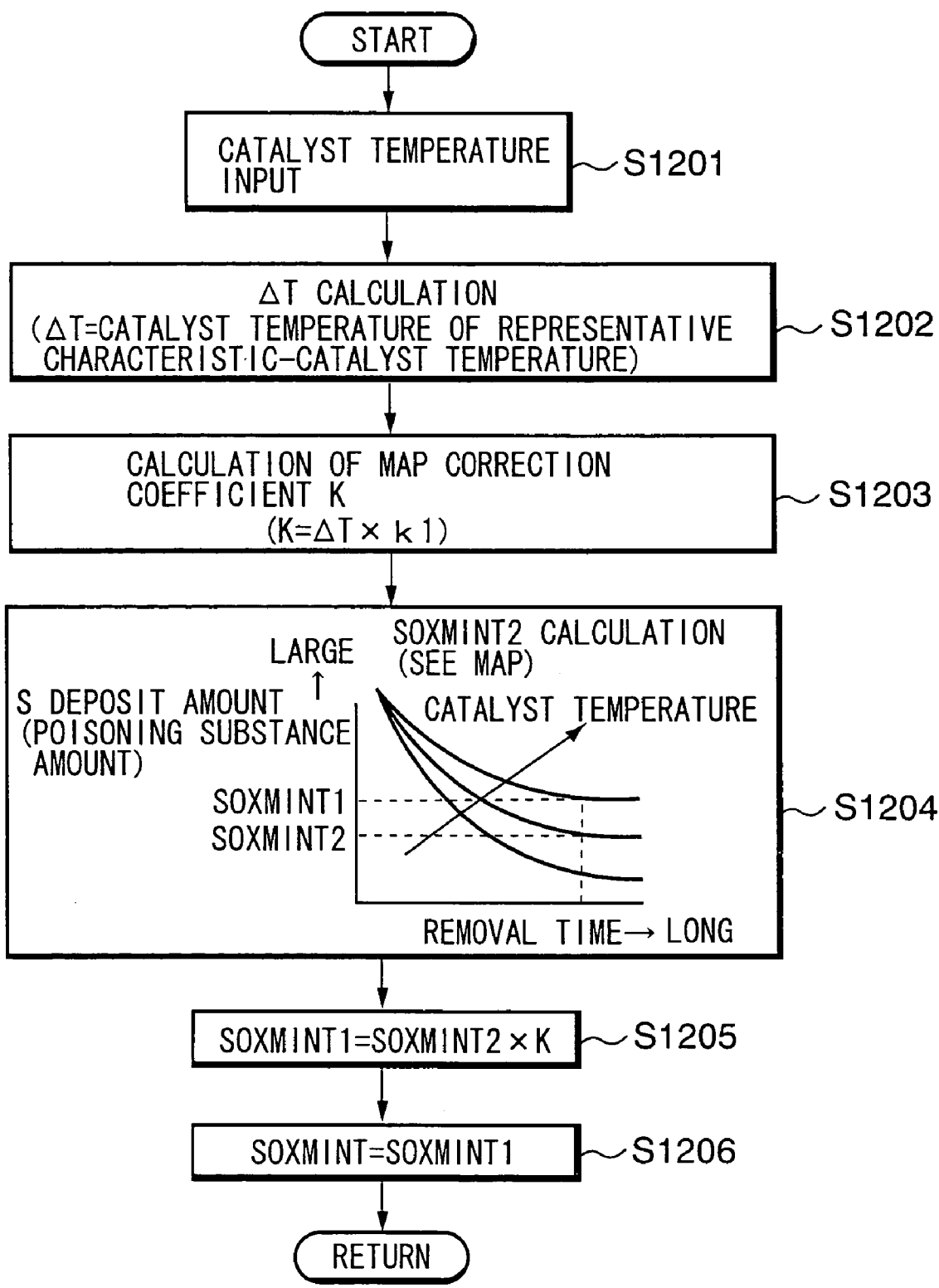
FIG. 13 is a flowchart showing a third embodiment calculating a lower limit based upon a catalyst temperature.

FIG. 13 shows further embodiment of calculation of the lower limit SOXMINT corresponding to a catalyst temperature. At S 1201, a catalyst temperature is input and at S 1202, a difference ΔT between a current, actual catalyst temperature input and a representative catalyst temperature corresponding to a characteristic representative of the catalyst temperature and the amount is calculated.

At S 1203, a correction coefficient K to a representative characteristic is calculated as follows. K=ΔT×k1 (k1:constant).

At S 1204, a representative amount SOXMINT2 is retrieved from a map made from a representative characteristic of the amount to the representative catalyst temperature and a relation between the catalyst temperature and the amount in FIG. 1.

At S 1205, an amount SOXMINT1 corresponding to the actual catalyst temperature is calculated based upon the following equation from the representative amount SOXMINT2 and the correction coefficient K.

SOXMINT1=SOXMINT2×K.

At S 1206, the amount SOXMINT is set as a lower limit SOXMINT1 corresponding to the catalyst temperature.

Figure 14:
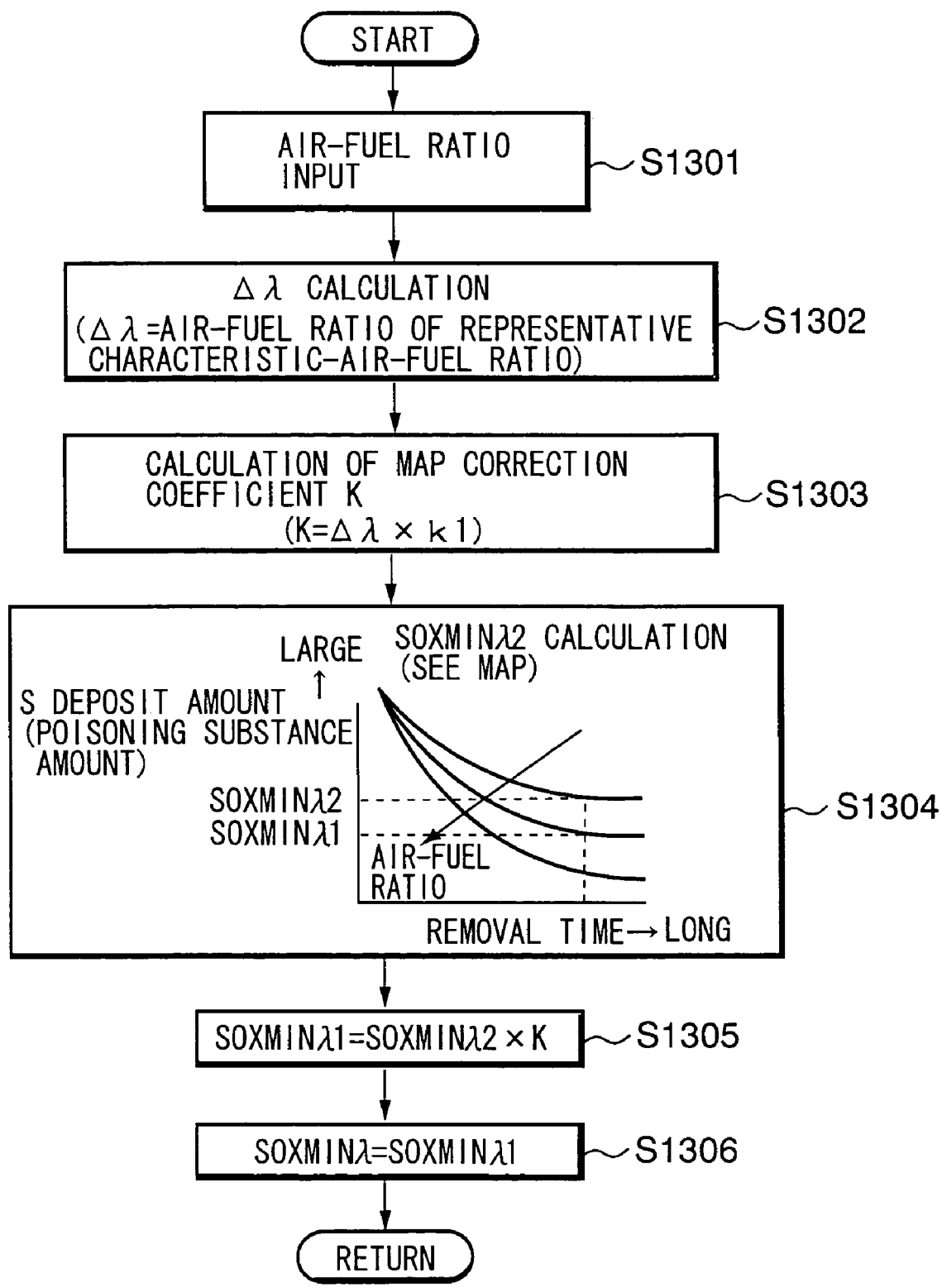
FIG. 14 is a flowchart showing a fourth embodiment calculating a lower limit based upon an air-fuel ratio.

FIG. 14 shows further embodiment of calculation of the lower limit SOXMINλ corresponding to an air-fuel ratio. At S 1301, an air-fuel ratio is input and at S 1302, a difference Δλ between a current and actual air-fuel ratio input and a representative air-fuel ratio corresponding to a characteristic representative of the air-fuel ratio and the amount is calculated.

At S 1303, a correction coefficient K to a representative characteristic is calculated as follows. K=Δλ×k1 (k1:constant).

At S 1304, a representative amount SOXMINλ2 is retrieved from a map made from a representative characteristic of the amount to the representative air-fuel ratio and a relation between the air-fuel ratio and the amount in FIG. 1.

At S 1305, an amount SOXMINλ1 corresponding to the actual air-fuel ratio is calculated based upon the following equation from the representative amount SOXMINλ2 and the correction coefficient K.

SOXMINλ1=SOXMINλ2×K.

At S 1306, the amount SOXMINλ is set as a lower limit SOXMINλ1 corresponding to the air-fuel ratio.

As described above, a memory data amount of a map can be reduced as a result of setting the lower limits SOXMINT, SOXMINλ corresponding to the actual catalyst temperature and air-fuel ratio by correcting the representative value of the lower limits.

FIG. 19 shows the result of the removal of the poisoning substance when the poisoning removal control is carried out using the lower limit. In the embodiment described above, NOx trap catalyst is used as an exhaust gas purification catalyst in which a poisoning substance is deposited, but not limited to NOx trap catalyst, any catalyst in which the poisoning substance is deposited can be used and the deposit amount can be estimated in the same processing. And also poisoning substance is not limited to sulfur.

This application claims priority to Japanese Patent Application No. 2002-140952 filed May 16, 2002. The entire disclosure of Japanese Patent Application No. 2002-140952 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined by the appended claims and their equivalents. Moreover, features of the different embodiments may be combined.

What is claimed is:

1. An exhaust gas purifying apparatus for an internal combustion engine comprising:
    an exhaust pipe in the internal combustion engine;
    an exhaust gas purification catalyst disposed in the exhaust pipe; and
    a controller programmed to:
    estimate an amount of poisoning substance deposited in the exhaust gas purification catalyst;
    perform a process to remove the poisoning substance;
    reduce the estimated amount based upon the removal amount of the poisoning substance;
    set a lower limit corresponding to a possible removal amount of the poisoning substance, the possible removal amount varying with a state of the exhaust gas purification catalyst; and
    end the process to remove the poisoning substance, when the controller judges that the estimated amount is less than the lower limit.

2. An apparatus according to claim 1, wherein the controller sets the lower limit based upon at least one of a catalyst temperature in the exhaust gas purification catalyst and an air-fuel ratio during performing the process.

3. An apparatus according to claim 2, wherein the controller sets a first lower limit corresponding to the catalyst temperature in the exhaust gas purification catalyst and a second lower limit corresponding to the air-fuel ratio separately and chooses a smaller lower limit out of the first and second lower limits as a final lower limit.

4. An apparatus according to claim 3, wherein the controller sets the first lower limit by retrieving a table where there is stored as the lower limit the amount of the poisoning substance for each catalyst temperature after performing the process for a predetermined time.

5. An apparatus according to claim 3, wherein the controller sets the first lower limit by retrieving a map where there is stored as the lower limit the amount of the poisoning substance for each catalyst temperature corresponding to an elapse time during performing the process.

6. An apparatus according to claim 3, wherein the controller sets the first lower limit by correcting a characteristic of the amount of the poisoning substance based upon a difference between a representative catalyst temperature and an actual catalyst temperature.

7. An apparatus according to claim 3, wherein controller sets the second lower limit by retrieving a table where there is stored as the lower limit the amount of the poisoning substance for each air-fuel ratio after performing the process for a predetermined time.

8. An apparatus according to claim 3, wherein the controller sets the second lower limit by retrieving a map where there is stored as the lower limit the amount of the poisoning substance for each air-fuel ratio corresponding to an elapsed time during performing the process.

9. An apparatus according to claim 3, wherein the controller sets the second lower limit by correcting a characteristic of the amount of the poisoning substance based upon a difference between a representative air-fuel ratio and an actual air-fuel ratio.

10. An apparatus according to claim 1, wherein the poisoning substance is sulfur.

11. An exhaust gas purifying apparatus for an internal combustion engine comprising:
    an exhaust pipe in the internal combustion engine;
    an exhaust gas purification catalyst disposed in the exhaust pipe;
    estimated amount reducing means for reducing the estimated amount based upon the removal amount of the poisoning substance;
    lower limit setting means for setting a lower limit corresponding to a possible removal amount of the poisoning substance, the possible removal amount varying with a state of the exhaust gas purification catalyst; and
    poisoning substance removal ending means for ending the process to remove the poisoning substance, when the estimated amount is less than the lower limit.

12. A method for purifying an exhaust gas in an internal combustion engine with an exhaust gas purification catalyst disposed in an exhaust pipe comprising:
    estimating an amount of a poisoning substance deposited in the exhaust gas purification catalyst;
    performing a process to remove the poisoning substance;
    reducing the estimated amount based upon the removal amount of the poisoning substance;
    setting a lower limit corresponding to a possible removal amount of the poisoning substance, the possible removal amount varying with a state of the exhaust gas purification catalyst; and
    ending the process to remove the poisoning substance, when the estimated amount is less than the lower limit.

13. An apparatus according to claim 11, wherein the poisoning substance is sulfur.

14. A method according to claim 12, wherein the poisoning substance is sulfur.

* * * * *